UNITED STATES PATENT OFFICE.

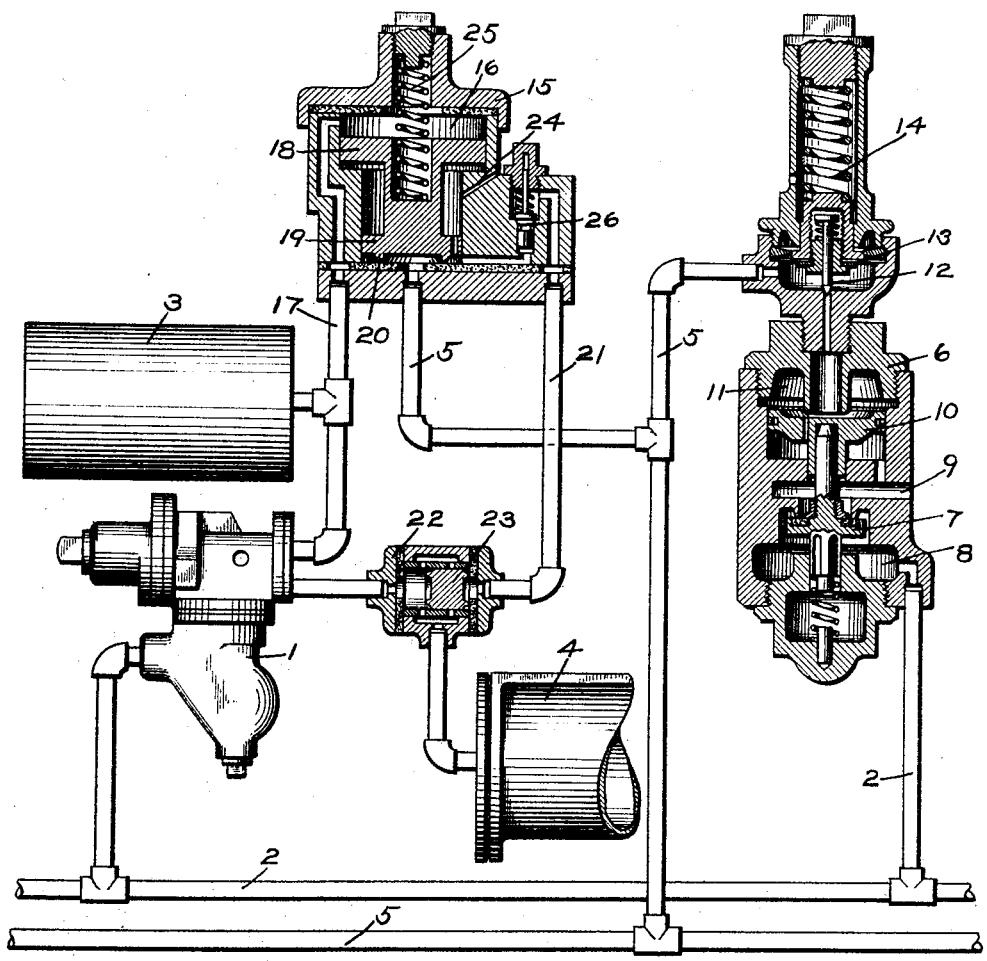

TOM R. BRISTOL, OF ATLANTA, GEORGIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE DEVICE.

1,403,839.  Specification of Letters Patent.  Patented Jan. 17, 1922.

Application filed June 9, 1920. Serial No. 387,610.

*To all whom it may concern:*

Be it known that I, TOM R. BRISTOL, a citizen of the United States, residing at Atlanta, in the county of Fulton and State of Georgia, have invented new and useful Improvements in Fluid-Pressure Brake Devices, of which the following is a specification.

This invention relates to fluid pressure brakes, and more particularly to a brake equipment in which the brakes are applied by increasing the signal pipe pressure above normal, in case an angle cock in the usual brake pipe has been accidentally closed; such as disclosed in the pending application of Clyde C. Farmer, Serial No. 372,117, filed April 8, 1920.

With an equipment of the above character, a case might occur where all the pressure on a car or a number of cars may be lost when an angle cock is accidentally closed, so that no brake application would be obtained on these cars, in case the signal pipe pressure is increased above normal for the purpose of producing an application of the brakes.

The principal object of my invention is to ensure a brake application under the above conditions.

In the accompanying drawing, the single figure is a diagrammatic view, partly in section, of a car fluid pressure brake equipment embodying my invention.

As shown in the drawing, the equipment may comprise the usual fluid pressure brake apparatus having a triple valve device 1 connected to a brake pipe 2, an auxiliary reservoir 3, and a brake cylinder 4.

Connected to a signal pipe line 5, and the brake pipe 2 is a valve device 6 operated upon an increase in signal pipe pressure above normal for venting fluid from the brake pipe to effect an application of the brakes and comprising a vent valve 7 for venting fluid from chamber 8, which is connected to brake pipe 2, to an exhaust port 9.

The valve 7 is adapted to be operated by a piston 10 upon the admission of fluid under pressure to chamber 11 at one side of the piston. A valve 12 controls the admission of fluid to the chamber 11 and is operated by a diaphragm 13, subject on one side to pressure in the signal pipe 5 and on the opposite side to the pressure of a coil spring 14.

The coil spring 14 is adjusted so that the valve 12 is held seated at the normal signal pipe pressure, but when the pressure in the signal pipe is increased above normal the valve 12 is opened so as to admit fluid from the signal pipe 5 to the chamber 11 and thus cause the movement of the piston 10 so as to open valve 7 and vent fluid from the brake pipe 2 to effect an application of the brakes by operating the triple valve device 1 in the usual manner.

According to my invention, an additional valve device 15 is provided, comprising a casing having a piston chamber 16, connected by pipe 17 to the auxiliary reservoir 3 and containing a piston 18. Connected to the piston 18 is a piston head 19 having a valve 20 for controlling communication from the signal pipe 5 to a pipe 21, which leads to a double check valve device 22.

The double check valve 23 therein is adapted to control communication from the triple valve device 1 to the brake cylinder 4 and from the pipe 21 to the brake cylinder.

The space intermediate the piston heads 18 and 19 is open to the atmosphere through a port 24 and piston head 18 is acted upon by a spring 25.

The ratio of the areas of the piston heads 18 and 19 and the adjustment of the spring 25 is such that when the auxiliary reservoir pressure is substantially lost and the signal pipe pressure is increased above normal, the valve 20 will be lifted from its seat.

In operation, the double check valve 23 will be normally seated to the right as shown in the drawing and the brakes may be applied and released in the usual manner, communication being established past the double check valve 23 from the triple valve device 1 to the brake cylinder 4.

If an angle cock in the brake pipe is found to be accidentally closed, the brakes may be applied by increasing the pressure in the signal pipe 5 above normal, so that the increased pressure, acting on diaphragm 13, will open the valve 12 and admit fluid under pressure to piston 10.

The piston 10 then operates to open valve 7 and thereby cause a venting of fluid from the brake pipe 2 so that the triple valve device 1 will be operated to effect an application of the brakes, provided that there is fluid under pressure in the auxiliary reservoir 3.

If the pressure in the auxiliary reservoir 3 has leaked off, then the brakes will not be applied by operation of the triple valve device, but the valve 20 will then be lifted from its seat, so that fluid under pressure will be supplied from the signal pipe 5, past the check valve 26 to pipe 21 and the double check valve 23 will be shifted to the left, cutting off the exhaust through the triple valve device and establishing communication from the pipe 21 to the brake cylinder 4, so that the brakes will then be applied by fluid under pressure from the signal pipe.

Having now described my invention, what I claim as new and desire to secure by Letters Patent, is:

1. The combination with a fluid pressure brake including an auxiliary reservoir, of a signal pipe line normally charged with fluid under pressure and means operated upon a predetermined reduction in auxiliary reservoir pressure for supplying fluid from the signal pipe line to effect an application of the brakes.

2. The combination with a fluid pressure brake including an auxiliary reservoir, of a signal pipe line normally charged with fluid under pressure and means operated by the pressure in the signal pipe line upon a predetermined reduction in auxiliary reservoir pressure for supplying fluid from the signal pipe line to effect an application of the brakes.

3. The combination with a fluid pressure brake including an auxiliary reservoir, of a signal pipe normally charged with fluid under pressure and means operated upon loss of auxiliary reservoir pressure and an increase in signal pipe pressure above normal for supplying fluid from the signal pipe to effect an application of the brakes.

4. The combination with a fluid pressure brake including an auxiliary reservoir, of a signal pipe normally charged with fluid under pressure and means subject to the opposing pressures of the auxiliary reservoir and signal pipe pressure and operated by an increase in signal pipe pressure upon loss of auxiliary reservoir pressure for supplying fluid from the signal pipe to effect an application of the brakes.

In testimony whereof I have hereunto set my hand.

TOM R. BRISTOL.